(12) United States Patent
Yoo et al.

(10) Patent No.: US 9,886,063 B2
(45) Date of Patent: Feb. 6, 2018

(54) BACKPLANE SUBSTRATE AND FLEXIBLE DISPLAY USING THE SAME

(71) Applicant: LG DISPLAY CO., LTD., Seoul (KR)

(72) Inventors: Se-Jong Yoo, Paju-si (KR); Nack-Bong Choi, Goyang-si (KR); Seung-Hee Kuk, Paju-si (KR)

(73) Assignee: LG DISPLAY CO., LTD., Seoul (KR)

( * ) Notice: Subject to any disclaimer, the term of this patent is extended or adjusted under 35 U.S.C. 154(b) by 16 days.

(21) Appl. No.: 15/209,104

(22) Filed: Jul. 13, 2016

(65) Prior Publication Data

US 2017/0031389 A1 Feb. 2, 2017

(30) Foreign Application Priority Data

Jul. 28, 2015 (KR) .................. 10-2015-0106850

(51) Int. Cl.
| | |
|---|---|
| *G06F 3/038* | (2013.01) |
| *G09G 5/00* | (2006.01) |
| *G06F 1/16* | (2006.01) |
| *G06F 3/044* | (2006.01) |
| G09G 3/3266 | (2016.01) |
| G09G 3/3233 | (2016.01) |

(52) U.S. Cl.
CPC ............ *G06F 1/1652* (2013.01); *G06F 3/044* (2013.01); *G06F 2203/04102* (2013.01); *G06F 2203/04103* (2013.01); *G09G 3/3233* (2013.01); *G09G 3/3266* (2013.01); *G09G 2300/0426* (2013.01); *G09G 2380/02* (2013.01)

(58) Field of Classification Search
CPC .................. G06F 1/1652; G06F 3/038; G06F 2203/04102; G09G 3/3233; G09G 2300/0408; G09G 2380/02; G02F 1/13452; H05K 3/361
See application file for complete search history.

(56) References Cited

U.S. PATENT DOCUMENTS

| | | | |
|---|---|---|---|
| 8,129,898 B2 * | 3/2012 | Choi .................. | H01L 27/3244 313/504 |
| 2005/0110785 A1 * | 5/2005 | Ochiai ................ | G09G 3/3233 345/206 |
| 2006/0273304 A1 * | 12/2006 | Cok .................... | H01L 51/0096 257/40 |

(Continued)

*Primary Examiner* — Joe H Cheng
(74) *Attorney, Agent, or Firm* — Dentons US LLP

(57) ABSTRACT

Disclosed is a flexible display device that includes a backplane substrate having an active area and a non-display area outside the display area, the active area having a plurality of pixels defined with a plurality of gate lines and a plurality of data lines, wherein the backplane substrate is defined with a folding axis with reference to which the display device is folded or bended and a folding area in which a radius of curvature remains substantially the same as a radius of curvature at the folding axis located at a center of the folding area when the display device is folded or bended; a plurality of embedded drivers on the backplane substrate in the non-display area, wherein two of the embedded drivers are spaced apart from each other outside the folding area with the folding area therebetween; and a plurality of link wires between the plurality of embedded drivers and the active area, electrically connecting the plurality of embedded drivers and one of the plurality of gate lines and the plurality of data lines.

24 Claims, 12 Drawing Sheets

(56) References Cited

U.S. PATENT DOCUMENTS

| | | | |
|---|---|---|---|
| 2009/0219225 A1* | 9/2009 | Cope | G09F 9/30 |
| | | | 345/55 |
| 2012/0262870 A1* | 10/2012 | Leung | G06F 1/1626 |
| | | | 361/679.27 |
| 2013/0265257 A1* | 10/2013 | Jung | G06F 3/0412 |
| | | | 345/173 |
| 2014/0029190 A1* | 1/2014 | Sato | G06F 1/1641 |
| | | | 361/679.27 |
| 2014/0226275 A1* | 8/2014 | Ko | G06F 1/1626 |
| | | | 361/679.27 |
| 2015/0227245 A1* | 8/2015 | Inagaki | G06F 3/0412 |
| | | | 345/173 |
| 2015/0261057 A1* | 9/2015 | Harris | G02B 26/026 |
| | | | 359/271 |
| 2016/0037625 A1* | 2/2016 | Huitema | H05K 1/028 |
| | | | 361/749 |
| 2016/0266672 A1* | 9/2016 | Inagaki | G09F 9/30 |

* cited by examiner

CLOCK SIGNAL LINE OR
VOLTAGE SIGNAL LINE

BACKPLANE SUBSTRATE AND FLEXIBLE DISPLAY USING THE SAME

CROSS-REFERENCE TO RELATED APPLICATIONS

This application claims the benefit of Korean Patent Application No. 10-2015-0106850, filed on Jul. 28, 2015, which is hereby incorporated by reference as if fully set forth herein.

BACKGROUND

Field of the Invention

The present invention relates to a display device and a method of manufacturing the same. More particularly, the present invention relates to a backplane substrate for a flexible display device and a method of manufacturing the same.

Discussion of the Related Art

Examples of flat display devices are a liquid crystal display (LCD), an organic light emitting display, a plasma display panel (PDP), a quantum dot display, a field emission display (FED), and an electrophoretic display (EPD). These displays commonly have a flat display panel on which an image is displayed. Such a flat display panel includes a pair of transparent insulated substrates coupled to each other while an optical material layer such as an inherent luminous material or polarizing material is disposed therebetween.

In recent years, there has been increasing demand for flat display devices occupying a small space as the size of display devices increases. The thickness of flexible displays continues to decrease, and foldable flexibly displays have been manufactured. In a conventional flexible display, the folding portions of the flexible display may be damaged when the flexible display is repeatedly folded, causing various problems.

In particular, in a case in which gate drivers are embedded in the edge of an active area in a panel, wires and circuits are concentrated in the gate driver regions, which have a lower resistance to folding stress, whereby cracks may occur or the wires may be broken. As a result, the pixels electrically connected to the wires, which are broken due to such a repeated folding, may not be turned on.

SUMMARY

Accordingly, the present invention is directed to a display device and a method of manufacturing the same that substantially obviate one or more problems due to limitations and disadvantages of the related art.

An advantage of the present invention is to provide a flexible display device with improved reliability.

Additional features and advantages of the invention will be set forth in the description which follows, and in part will be apparent from the description, or may be learned by practice of the invention. These and other advantages of the invention will be realized and attained by the structure particularly pointed out in the written description and claims hereof as well as the appended drawings.

To achieve these and other advantages and in accordance with the purpose of the invention, as embodied and broadly described herein, a flexible display device may, for example, include a backplane substrate having an active area and a non-display area outside the display area, the active area having a plurality of pixels defined with a plurality of gate lines and a plurality of data lines, wherein the backplane substrate is defined with a folding axis with reference to which the display device is folded or bended and a folding area in which a radius of curvature remains substantially the same as a radius of curvature at the folding axis located at a center of the folding area when the display device is folded or bended; a plurality of embedded drivers on the backplane substrate in the non-display area, wherein two of the embedded drivers are spaced apart from each other outside the folding area with the folding area therebetween; and a plurality of link wires between the plurality of embedded drivers and the active area, electrically connecting the plurality of embedded drivers and one of the plurality of gate lines and the plurality of data lines.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings.

DETAILED DESCRIPTION OF THE ILLUSTRATED EMBODIMENTS

Reference will now be made in detail to embodiments of the present invention, examples of which are illustrated in the accompanying drawings. Wherever possible, the same reference numbers will be used throughout the drawings to refer to the same or like parts. In the following description, a detailed description of known functions and configurations incorporated herein will be omitted when it may obscure the subject matter of the present invention. In addition, the terms used in the following description are selected in consideration of the ease of preparation of the specification, and may be different from the names of parts constituting a real product.

Figure 1A:
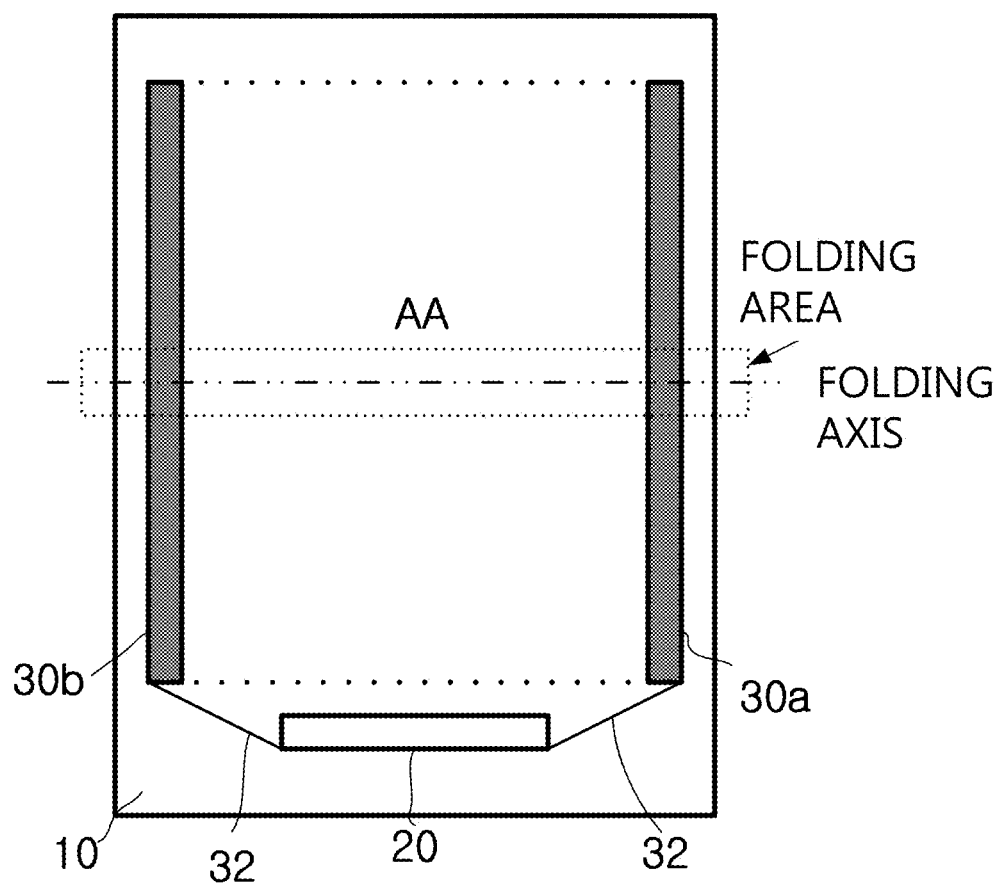
FIG. 1A is a plan view illustrating a backplane substrate having therein gate drivers.
Figure 1B:
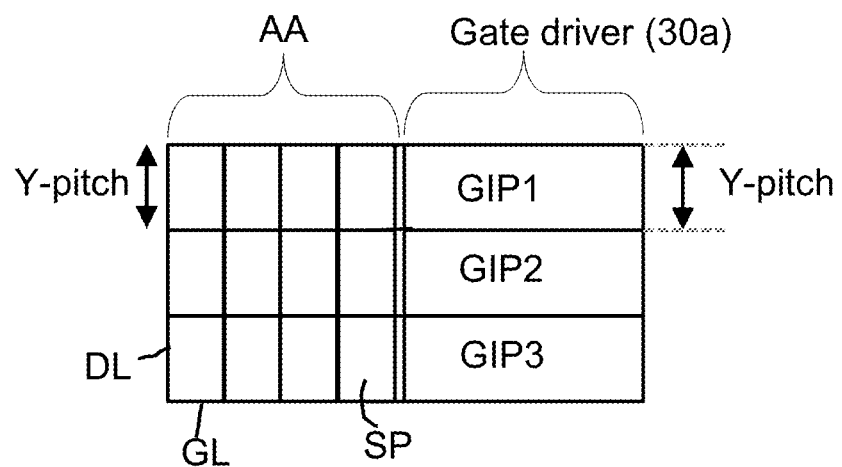
FIG. 1B is a plan view illustrating a construction of the gate drivers of FIG. 1A and an active area adjacent to the gate drivers.

FIG. 1A is a plan view illustrating an example of a backplane substrate having therein gate drivers, and FIG. 1B is a plan view illustrating the construction of the gate drivers of FIG. 1A and an active area, which is adjacent to the gate drivers.

In recent years, there has been a strong demand for a flexible display. In particular, it would be beneficial to slim a backplane having an array in order to uniaxially fold the display or to bend a specific area of the display at a predetermined angle. For this reason, a backplane having therein drivers, which are conventionally connected to an outer film with a chip, has been proposed. In addition, drivers may be divided into gate drivers and data drivers, which respectively transmit signals to gate lines (scan lines) and data lines provided at the array of the display. The gate drivers, which sequentially apply gate switching signals to the gate lines, may be more easily embedded in a substrate (a panel) than the data drivers, which process a relatively large amount of data with a higher mobility.

Here, the term "embedding" means forming a wire (a line) or a thin film transistor in the area of the backplane substrate together with configuring an array of the backplane substrate to provide a circuit function.

FIG. 1A illustrates an example in which gate drivers 30a and 30b, which transmit scan signals to gate lines (not shown) formed in an X-axis direction (the gate lines being arranged in an active area at intervals in the X-axis direction), are provided at opposite ends of the active area of the backplane substrate 10 in a contact state.

Meanwhile, reference numeral 20 in FIG. 1A indicates a driver IC provided at one side of the backplane substrate 10. The driver IC functionally includes a data driver for transmitting signals to the data lines and a timing controller for generating and transmitting clock signals of the gate drivers and the data driver. Reference numeral 32 indicates clock signal lines for transmitting clock signals from the timing controller in the driver IC to the gate drivers. Meanwhile, the driver IC 20 is bonded to a pad electrode (not shown) of the data lines and a pad electrode of the clock signal lines.

Although FIG. 1A illustrates the gate drivers 30a and 30b in a block state, gate circuit blocks GIP1, GIP2, GIP3, . . . are arranged at the same pitch as a Y-pitch between the gate lines, and each of the gate circuit blocks GIP1, GIP2, GIP3, . . . includes a shift register, a level shifter, and a buffer, as illustrated in FIG. 1B. In this case, an output end of each buffer is directly connected to one end of a corresponding one of the gate lines GL. As a result, the gate drivers 30a and 30b are connected to the gate lines GL without being spaced apart from the active area AA.

Figure 2:
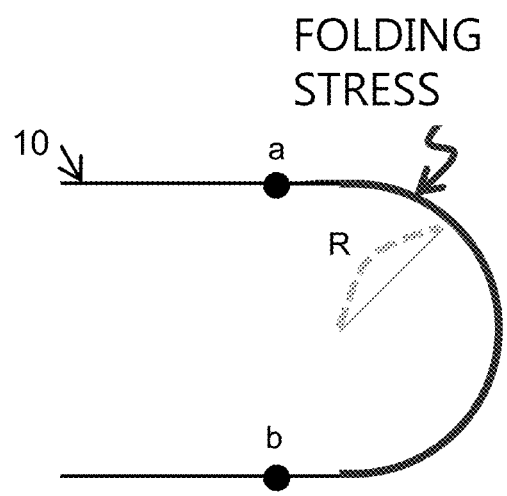
FIG. 2 is a sectional view illustrating the backplane substrate of FIG. 1A when folded.

FIG. 2 is a sectional view illustrating the backplane substrate of FIG. 1A when folded.

Referring to FIG. 2, when the backplane substrate 10 of FIG. 1A is folded into halves, the backplane substrate 10 is bent at the folding portion thereof. The bending may vary depending upon the flexibility of the backplane substrate 10. For example, in a case in which the backplane substrate 10 has a radius R at the folding portion thereof, the backplane substrate 10 is bent along a length equivalent to about $\pi*R+\alpha$, when viewed in section. Here, the folding portion is illustrated as a uniaxial line in a plane, which is referred to as a folding line.

When the backplane substrate 10 having therein the gate drivers as illustrated in FIG. 1A is repeatedly folded, cracks or damages may occur at the bent portion of the backplane substrate 10, at which the gate drivers are located. Thin film transistors and wires are typically concentrated in the gate drivers. Here, deterioration due to repeated folding is referred to as "folding stress."

Figure 3:
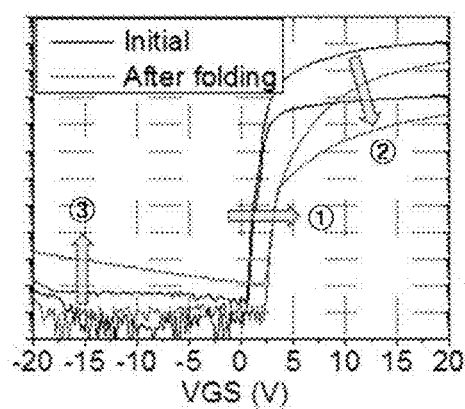
FIG. 3 is a graph showing a relationship between voltage and current of a thin film transistor, characteristics of which are degraded due to repeated folding.

FIG. 3 is a graph showing a relationship between voltage and current of a thin film transistor, characteristic of which are degraded due to repeated folding.

Referring to FIG. 3, when folding is repeated, the threshold voltage Vth increases (see ①), the device mobility is lowered (see ②), and the off current Ioff increases (see ③). That is, when the gate drivers 30a and 30b are provided as illustrated in FIG. 1A, the circuits constituting the gate drivers 30a and 30b may be directly affected by the folding stress, since the circuits constituting the gate drivers 30a and 30b are formed in the area of the backplane substrate to which the folding stress is applied. As the folding radius is reduced or the number of times that the substrate is folded is increased, a higher stress is applied to the folding area. When the folding stress reaches a critical point, the thin film transistors located in the folding area may be degraded or the folding area may crack, with a result that the backplane substrate becomes defective.

That is, a thin film transistor and a plurality of wires are formed in each gate driver in an overlapping state. In particular, the thin film transistor provided in the gate driver in the folding line may suffer from an increased threshold voltage, a reduced device mobility and an increased off current, as shown in FIG. 3. As a result, the driving voltage of the thin film transistor may increase, the driving speed may be lowered, and the reliability may also be lowered.

Figure 4:
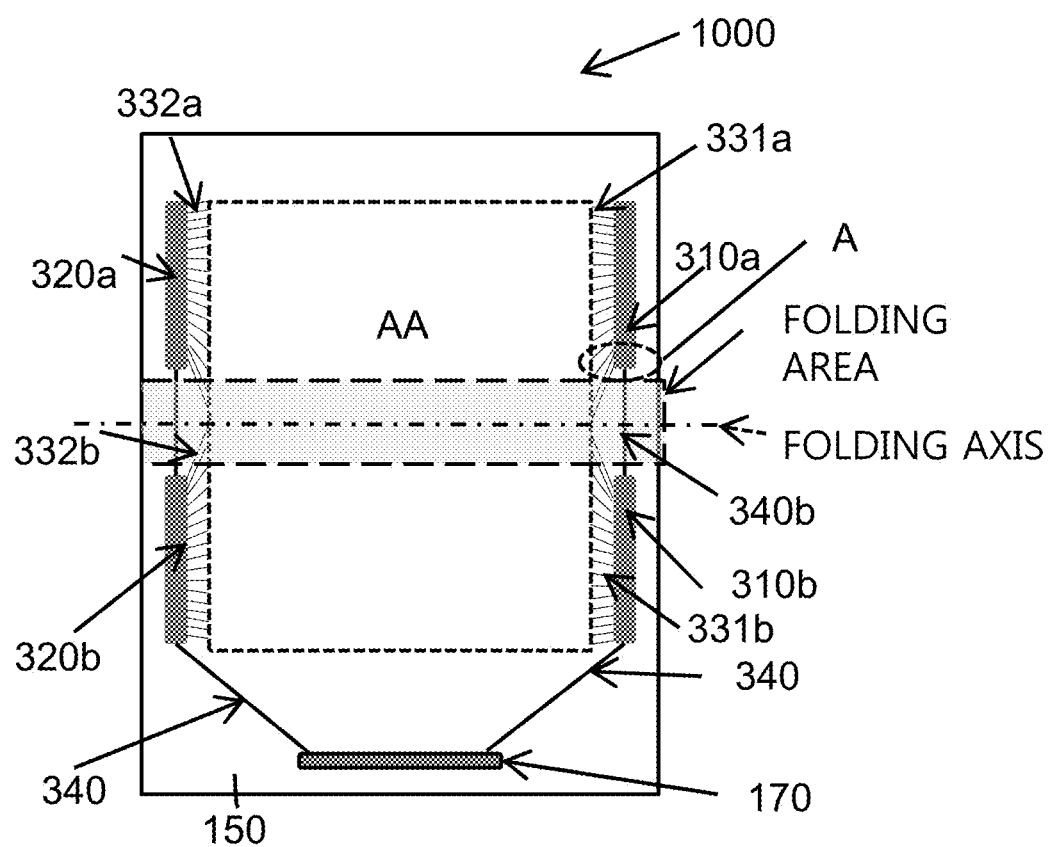
FIG. 4 is a plan view illustrating a backplane substrate according to an embodiment of the present invention.
Figure 5:
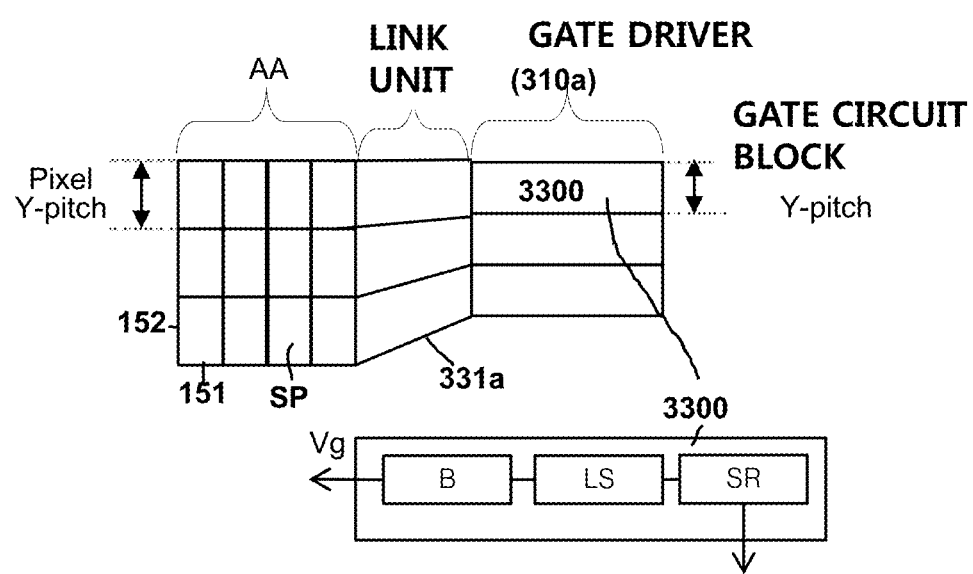
FIG. 5 is a plan view illustrating a relationship between an active area and gate drivers of FIG. 4.
Figure 6:
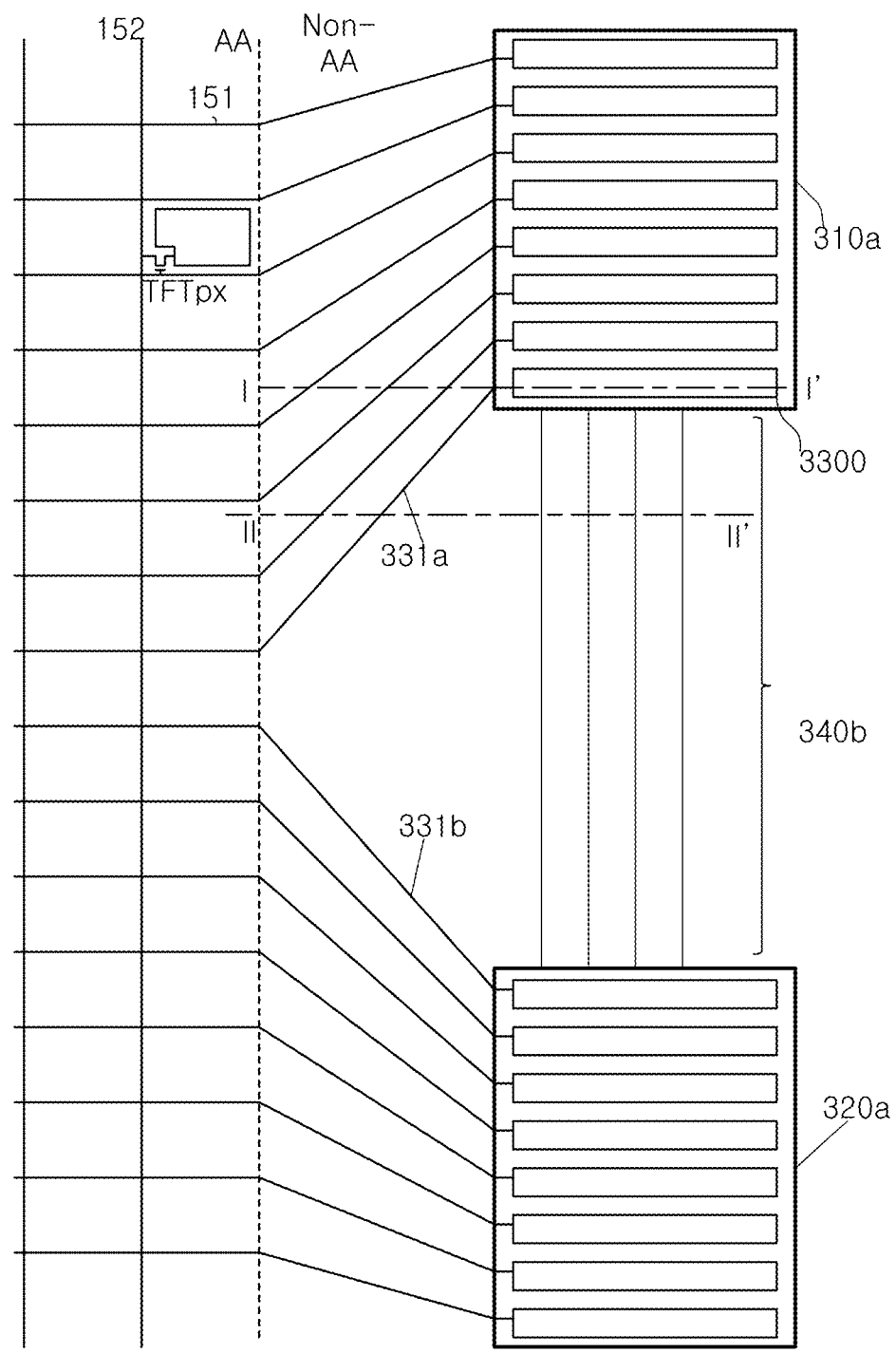
FIG. 6 is an enlarged plan view illustrating area A of FIG. 4.

FIG. 4 is a plan view illustrating a backplane substrate according to an embodiment of the present invention, FIG. 5 is a plan view illustrating a relationship between an active area and gate drivers of FIG. 4, and FIG. 6 is a plan view illustrating connection between the gate drivers and gate lines of the backplane substrate.

Referring to FIGS. 4 and 5, the backplane substrate 1000 according to an embodiment of the present invention includes a flexible base film 150 having an active area AA, in which a plurality of pixels SP are arranged in a matrix, and a non-display area disposed outside the active area AA, at least one uniaxial folding line being defined in the flexible base film 150. The backplane substrate 1000 further includes gate lines 151 and data lines 152 provided at boundaries of the respective pixels of the active area SS in a crossing fashion, gate drivers 310a, 310b, 320a, and 320b embedded in the non-display area of the flexible base film 150 so as not to overlap the folding line, and link wires 331a, 331b, 332a, and 332b for connecting the gate drivers 310a, 310b, 320a, and 320b to corresponding ends of the gate lines 151 in the non-display area of the flexible base film 150.

In FIG. 4, a single folding line is formed along an X axis to divide the active area AA of the flexible base film 150 into halves. However, the present invention is not limited thereto. A plurality of folding lines may be formed in different regions.

Alternatively, the folding line may be formed in a Y-axis direction or may be oriented at a predetermined acute angle with respect to the X axis. The folding line is defined in advance in the flexible base film 150. The flexible base film 150 generally has sufficient ductility. When the backplane substrate is used in a flexible display, however, the flexible base film 150 may be mounted to a structure such as a bezel (not shown). In this case, the bendable region of the bezel may become a folding line.

As described above, in the backplane substrate 1000 according to an embodiment of the present invention, the folding line is defined in advance, and the gate drivers 310a, 310b, 320a, and 320b are arranged so as not to overlap the folding line. The term 'folding line,' in which the gate drivers do not overlap, indicates a folding portion of a foldable display. However, the present invention is not limited to a foldable display, and the gate drivers may also be arranged so as not to overlap a bending portion of a bendable display. Also, the term 'folding area' refers to an area in which a radius of curvature remains substantially the same as a radius of curvature at the folding line or axis located at a center of the folding area when the display device is folded or bended.

The backplane substrate 1000 has one side of the non-display area that has a longer width than the other three sides of the non-display area. A driver IC 170 is provided in an extended region of the side having the longer width. The driver IC 170 includes a data driver 171 for transmitting signals to the data lines 152 and a timing controller 172 for generating and transmitting clock signals of the gate drivers 310a, 310b, 320a, and 320b and the data driver 171. The clock signals generated by the timing controller 172 are transmitted to the data driver 171 in the driver IC 170 and transmitted to the gate drivers 310a, 310b, 320a, and 320b via clock signal lines and voltage signal lines 340b, which are formed in the flexible base film 150.

The driver IC 170 is connected to a clock signal pad electrode and a voltage signal pad electrode, provided at one end of each of the gate driver input signal lines 340, and to a data pad electrode (not shown), extending from the data lines 152 of the active area AA to the non-display area. The clock signal pad electrode, the voltage signal pad electrode, and the data pad electrode are formed on the same layer as the gate lines or the data lines provided in the active area, and are formed of the same metal as the gate lines or the data lines provided in the active area.

A plurality of clock signal lines may be provided in order to supply different clock signals. In addition, the voltage signal lines are lines for applying voltage signals, such as gate high voltage, gate low voltage, and ground voltage, related to the driving of the gate lines. In addition, the clock signal lines and the voltage signal lines 340b may be formed of the same metal as the gate driver input signal lines 340, and may transmit the same kind of signals as the gate driver input signal lines 340. The clock signal lines 340b and the voltage signal lines 340b for supplying gate high voltage, gate low voltage, and common voltage may be further provided between the lower gate drivers 310b and 320b, which are adjacent to the driver IC 170. The voltage signal lines and the clock signal lines 340b are arranged in a direction (Y-axis direction) crossing the lower gate drivers 310b and 320b and the upper gate drivers 310a and 320a to interconnect adjacent gate drivers 310a and 310b or 320a and 320b.

In this embodiment, the gate drivers 310a, 310b, 320a, and 320b are not disposed on the folding line, and the voltage signal lines and the clock signal lines 340b are disposed on the folding line. That is, devices, such as thin film transistors, which have overlapping electrodes, are not disposed in the folding line, whereby the gate drivers 310a, 310b, 320a, and 320b are not directly affected even when the folding line is repeatedly folded. In other words, no crystalline active layers are included in the folding line, and therefore devices, such as thin film transistors, which crack easily, may not suffer from folding stress.

Meanwhile, since gate circuit blocks 3300 of each of the gate drivers 310a, 310b, 320a, and 320b are arranged at a smaller Y-pitch than the Y-pitch between the gate lines, the gate circuit blocks 3300 are not disposed on the same line as the gate lines except for the uppermost gate line and the lowermost gate line. Consequently, a link unit is provided between the gate circuit blocks 3300 of each of the gate drivers in the non-display area and the gate lines in the active area. The link unit includes link wires 331a, 331b, 332a, and 332b for connecting the gate circuit blocks 3300 with corresponding ends of the respective gate lines.

The closer the link wires 331a, 331b, 332a, and 332b are to a center of the folding line, the steeper the inclination of the link wires 331a, 331b, 332a, and 332b relative to the gate lines is. Thus, the link wires 331a, 331b, 332a, and 332b are longer, as illustrated in FIG. 4.

In this embodiment, the gate drivers 310a, 310b, 320a, and 320b are provided at opposite ends of the active area AA in order to apply gate signals in the leftward and rightward directions. Alternatively, the gate drivers may be provided only on one side of the active area AA. In any case, the gate drivers are disposed separately above and below the folding line at one side or at opposite sides of the active area AA (310a and 310b or 320a and 320b).

As illustrated in FIG. 5, each of the gate drivers 310a, 310b, 320a, and 320b may include a plurality of gate circuit blocks 3300 corresponding to the respective gate lines 151. Each of the gate circuit blocks 3300 may include a shift register SR, a level shifter LS, and a buffer B.

Hereinafter, an operation of each of the gate circuit blocks 3300 will be described.

First, in each of the gate circuit blocks 3300, the shift register SR sequentially shifts a logic high signal in line at an on-time interval. The level shifter LS converts a gate high voltage and a gate low voltage supplied from the voltage signal lines into on/off voltage of the gate lines according to the output logic level from the shift register. The buffer B amplifies the current thereof in consideration of the loads of the gate lines, and transmits a gate-on voltage to the gate lines via the link wires 331a, 331b, 332a, and 332b.

In this embodiment, the gate drivers 310a, 310b, 320a, and 320b are disposed in a manner to not overlap the folding line. Consequently, the sum of the vertical lengths of the first and second gate drivers 310a and 310b or the third or fourth gate drivers 320a and 320b disposed at one side while being divided by the folding line is smaller than the length of the gate driver 30a or 30b formed in one direction, as illustrated in FIG. 1A. As illustrated in FIG. 5, therefore, the Y-pitch between the gate circuit blocks 3300 in the gate drivers 310a, 310b, 320a, and 320b is beneficially smaller than the Y-pitch between the gate lines 151 in the active area AA.

A plurality of clock signal lines and a plurality of voltage signal lines 340b are provided in the non-display area of the flexible base film 150 in a Y-axis direction. The clock signal lines and the voltage signal lines 340b extend between the gate drivers 310a, 310b, 320a, and 320b, which are disposed separately above and below the folding line, while overlapping the folding line.

The clock signal lines and the voltage signal lines 340b, each of which has at least one bending portion in a plane between the gate drivers 310a, 310b, 320a, and 320b, which are disposed separately above and below the folding line, may be formed of metal on the same layer as the gate lines 151 or the data lines 152, and the clock signal lines and the voltage signal lines 340b may interconnect the separated gate drivers 310a, 310b, 320a, and 320b.

Meanwhile, the flexible base film 150, which constitutes the backplane substrate 1000, is a ductile plastic film, which may include at least one high molecular compound selected from a group including polyester or a copolymer including polyester, polyimide or a copolymer including polyimide, an olefin-based copolymer, polyacrylic acid or a copolymer including polyacrylic acid, polystyrene or a copolymer including polystyrene, polysulfate or a copolymer including polysulfate, polycarbonate or a copolymer including polycarbonate, polyamic acid or a copolymer including polyamic acid, polyamine or a copolymer including polyamine, polyvinyl alcohol, and polyallylamine.

The flexible base film 150 may have a thickness of 5 μm to 150 μm. Specifically, the flexible base film 150 may have a thickness of 50 μm or less. In addition, in order to reduce or prevent the flexible base film 150 from being rolled or damaged due to heat or pressure when an array-forming process is directly formed on the flexible base film 150, the flexible base film 150 may be formed on a glass substrate, and then a buffer layer 153 may be further formed on the surface of the flexible base film 150. In such a case, the glass substrate can be removed after completing the array-forming process, which leaves the flexible base film 150 on the surface of an organic light emitting diode panel.

Figure 7:
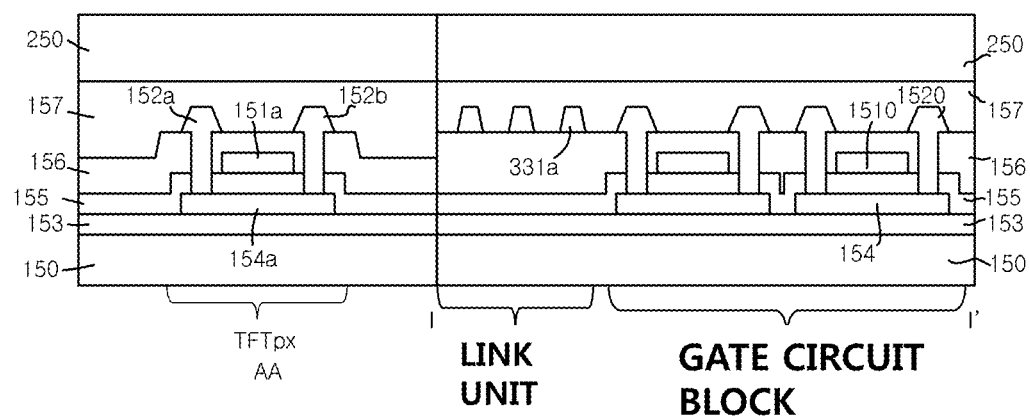
FIG. 7 is a sectional view taken along line I-I' of FIG. 6.

A construction of a pixel thin film transistor, a gate driver, and a link unit provided in the active area AA will now be described with reference to FIGS. 7 and 8. FIG. 7 is a sectional view taken along line I-I' of FIG. 6, and FIG. 8 is a sectional view taken along line II-II' of FIG. 6.

Figure 8:
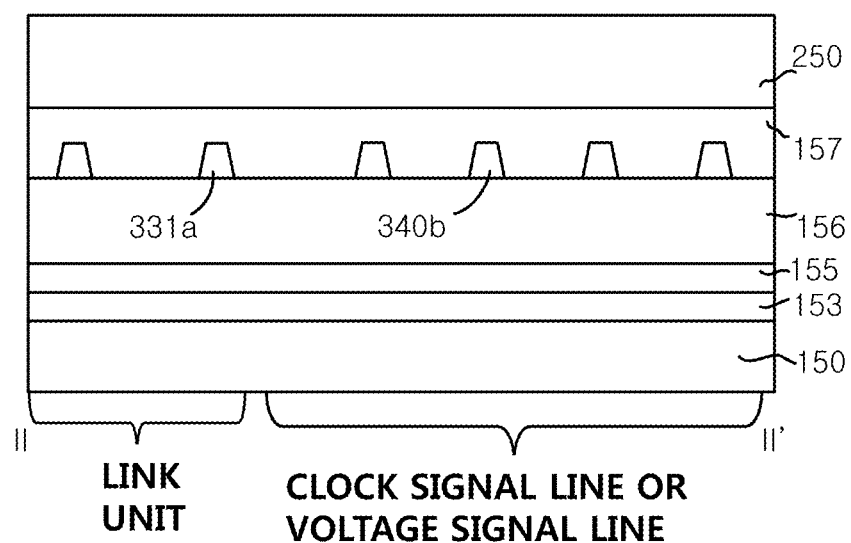
FIG. 8 is a sectional view taken along line II-II' of FIG. 6.

Referring to FIGS. 7 and 8, each pixel in the active area AA includes a pixel TFT, which is disposed between the gate line 151 and the data line 152. For example, the pixel TFT includes an island-shaped active layer 154a formed at a predetermined area on the buffer layer 153, a gate electrode 151a located on the active layer 154a, and a source electrode 152a and a drain electrode 152b connected to opposite ends of the active layer 154a.

The active layer 154a may be at least one selected from the group including an amorphous silicon layer, a crystalline silicon layer, and an oxide semiconductor layer. The opposite ends of the active layer 154a may be doped with dopants such that the active layer 154a can be electrically connected to the source electrode 152a and the drain electrode 152b.

The stacking sequence of the active layer 154a, the gate electrode 151a, and the source/drain electrodes 152a or 152b may be changed as desired. Meanwhile, in a case in which the gate electrode 151a is integrally formed with the gate line 151 or is connected to the gate line 151 and in a case in which the source electrode 152a is connected to the data line 152 or is integrally formed with the data line 152, the gate electrode 151a and the source electrode 152a function as the pixel TFT. In addition to the pixel TFT, additional TFTs may be provided, depending on the display mode. In such a case, the connection between the gate electrode and the source electrode of each of the TFTs and the lines (the gate line and the data line) may be changed.

A gate dielectric 155 is interposed between the active layer 154a and the gate electrode 151a, an interlayer dielectric 156 is interposed between the gate electrode 151a and the source/drain electrodes 152a or 152b, and a passivation film 157 is formed on the interlayer dielectric 156.

An encapsulation layer 250 is formed on the uppermost surface of the backplane substrate 1000 to cover the passivation film 157. An organic light emitting device is further provided at each device in the active area of the backplane substrate 1000. The encapsulation layer 250 may be omitted. The encapsulation layer 250 includes n pairs or n.5 pairs (n being a natural number) of organic films and inorganic films. That is, the organic films and the inorganic films are alternately stacked in the encapsulation layer 250. The encapsulation layer 250 covers the active area AA, including the gate lines 151 and the data lines 152, on the flexible base film 150, the gate drivers 310a, 310b, 320a, and 320b, and the link wires 340b. That is, in a case in which the gate drivers 310a, 310b, 320a, and 320b and the link wires 340b are formed so as to be embedded in the panel, and the organic light emitting array is included in the active area, the gate drivers 310a, 310b, 320a, and 320b and the link wires 340b are covered by the encapsulation layer 250 of the organic light emitting array. At this time, as shown in FIG. 4, the driver IC 170 is located on one side of the non-display area, which is exposed from the encapsulation layer 250.

A plurality of TFTs, each of which is identical or similar in shape to the pixel TFT, is provided in each gate circuit block 3300 on the gate driver side. That is, the shift register, the level shifter, and the buffer may be replaced by the TFTs.

In the embodiment illustrated in FIGS. 7 and 8, the link wires 331a are located on the same layer as the data lines 152. However, the present invention is not limited thereto. The link wires 331a may be located on the same layer as the gate lines 151. In any case, the link wires 331a are electrically connected to the gate lines 151, and gate voltage signals from the gate circuit blocks 3300 are applied to the gate lines 151. In addition, in the illustrated example, the clock signal lines and voltage signal lines 340b are located on the same layer as the data lines 152. However, the present invention is not limited thereto. The clock signal lines and voltage signal lines 340b are located on the same layer as the gate lines 151. The clock signal lines and voltage signal lines 340b interconnect the separated gate drivers 310a and 310b or 320a and 320b.

In FIGS. 7 and 8, the gate drivers are located in an area that does not overlap the folding line of FIG. 7 and no gate drivers are located in an area corresponding to the folding line of FIG. 8. That is, as illustrated in FIG. 8, the clock signal lines and the voltage signal lines for applying clock signals and voltage signals to the gate drivers outside the folding line are disposed in an area where no gate driver is located. These lines are formed by patterning metal to have predetermined widths. Even when these lines are located in an area where a folding stress is applied, the external force generated by a folding along the folding axis is distributed over the clock signal lines and the voltage signal lines. As a result, the external force is not concentrated on a specific area, which may reduce or prevent cracks from occurring. In addition, the gate drivers are disposed so as not to overlap the folding line. As a result, no TFT is disposed in the folding line, thereby reducing or preventing degradation of the TFTs, which was described with reference to FIG. 3.

Figure 9:
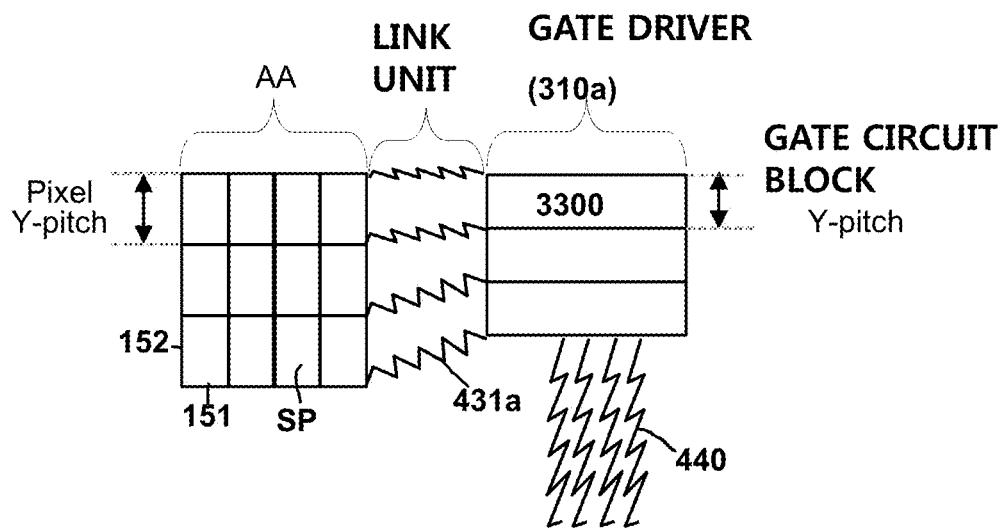
FIG. 9 is a plan view illustrating a backplane substrate according to another embodiment of the present invention.

FIG. 9 is a plan view illustrating a backplane substrate according to another embodiment of the present invention.

Referring to FIG. 9, in the backplane substrate according to this embodiment, link wires 431a may have at least one bending portion, with each link wire 431a having a zigzag shape. The bending portion may be provided at a part of each link wire 431 or over each link wire 431. In a case in which each link wire 431a is formed so as to extend in one direction, a folding stress is transmitted to each link wire 431a even when the folding stress is applied to a part of each link wire 431a. In order to distribute the folding stress, the bending portion is formed at each link wire 431. In addition to the link wires 431a, clock signal lines 440 and voltage signal lines may also have bending portions.

In a case in which the link wires 431a, the clock signal lines 440, and the voltage signal lines have bending portions, the link wires 431a, the clock signal lines 440, and the voltage signal lines may be formed of a low-resistance member, because resistance increases as the length of the wires or the lines is increased. The low-resistance member may be a single material having a high conductivity. Alternatively, a plurality of metal layers may be stacked together to form a low-resistance member. For example, a stack of Ti/Al/Ti metal layers may be used. However, the present invention is not limited thereto. Any metal having a low-resistance property may be used.

The bending portions may be applied only to the link wires, or only to the clock signal lines and the voltage signal lines, which interconnect gate drivers. Alternatively, the bending portions may be applied to all of the link wires, the clock signal lines, and the voltage signal lines. The extent of bending may be adjusted in consideration of resistance, which may increase due to adjacency between the respective lines.

Figure 10:
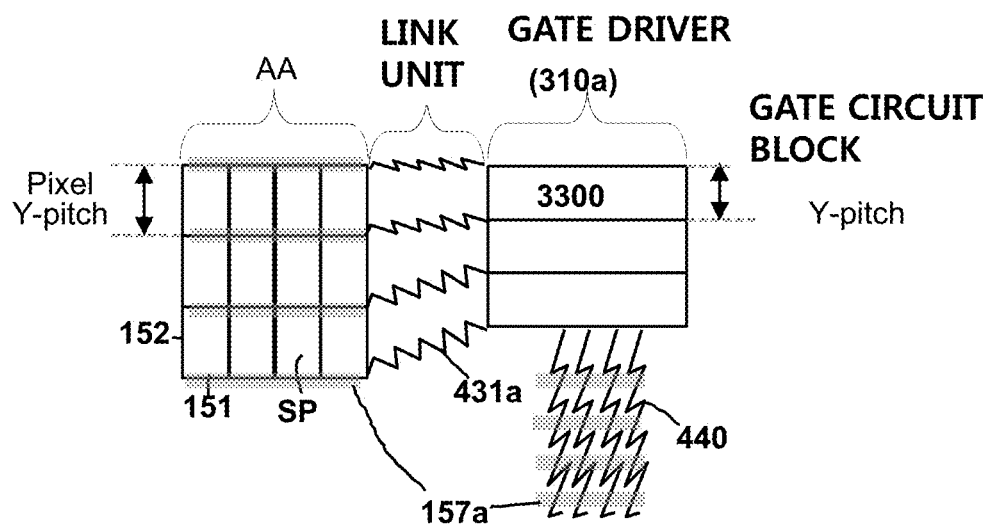
FIG. 10 is a plan view illustrating a modification of the backplane substrate of FIG. 9.
Figure 11:
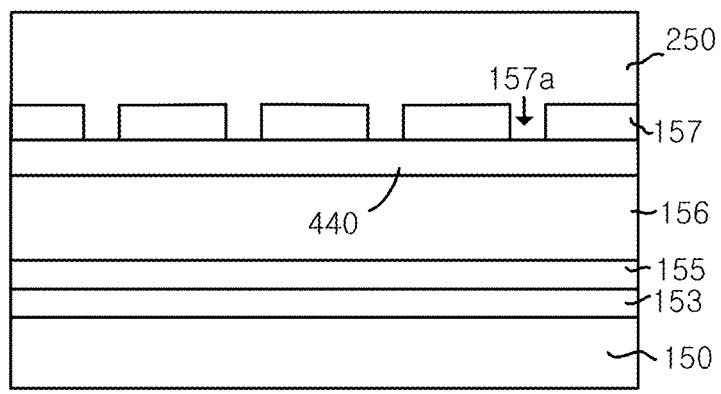
FIG. 11 is a sectional view taken along a clock wire of FIG. 10.

FIG. 10 is a plan view illustrating a modification of the backplane substrate of FIG. 9, and FIG. 11 is a sectional view taken along a clock wire of FIG. 10.

Referring to FIGS. 10 and 11, slits 157a are formed in inorganic films, such as a passivation film 157, an interlayer dielectric 156, and a gate dielectric 155, which are located on or under the link wires or the clock signal lines and the voltage signal lines. In the example illustrated in FIG. 11, the slits 157a are formed in the passivation film 157. Alternatively, the slits may be formed in the inorganic films 156 and 155 located under the link wires or the clock signal lines and the voltage signal lines.

Each slit has a shape crossing the link wires or the clock signal lines and the voltage signal lines in order to distribute folding stress. A direction in which the slits are formed may be the same as the direction of a folding axis. In this example, the slits may be arranged along an X axis, since the folding axis is oriented in an X-axis direction. Meanwhile, even in the active area AA, inorganic films may be patterned between the first flexible base film 150 and the gate line 151, between the gate line 151 and the data line 152, or on the data line 152 in order to form slits along the same axis as the folding line. Here, the inorganic films may include a gate dielectric 155, an interlayer dielectric 156, and a passivation film 157.

Hereinafter, an example in which a backplane substrate according to an embodiment of the present invention is applied to a flexible display will be described.

Flexible base films are applied to the upper and lower surfaces of a flexible display. For convenience, the base film of the backplane substrate will be referred to as a first flexible base film, and an upper base film will be referred to as a second flexible base film. The first and second flexible base films may be made of the plastic materials that were previously described. The first and second flexible base films may be made of the same material or different materials.

Various types of flexible displays can be provided depending on the display mode. In the following embodiments, a liquid crystal display and an organic light emitting display are mainly described.

Figure 12A:
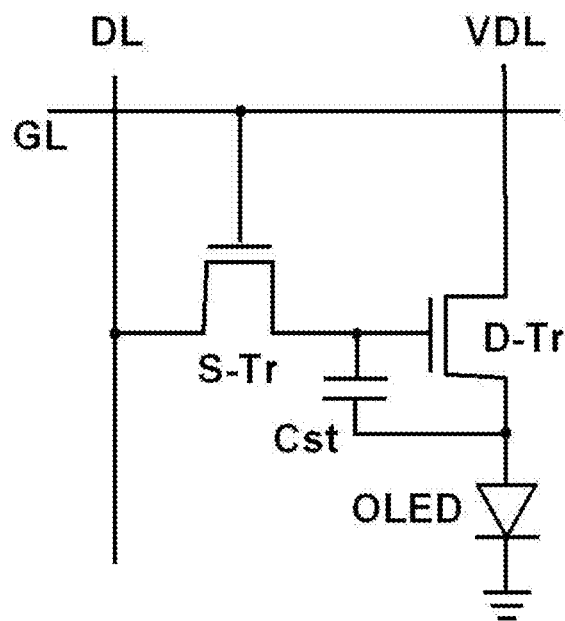
FIGS. 12A and 12B are views illustrating examples of a circuit provided in each pixel of a flexible display according to an embodiment of the present invention.
Figure 12B:
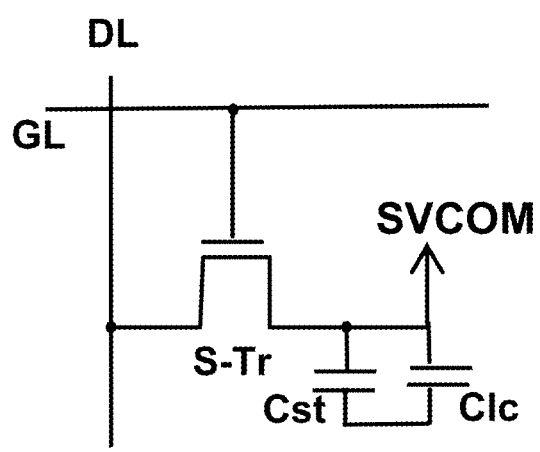

FIGS. 12A and 12B are views illustrating examples of a circuit provided in each pixel of a flexible display according to embodiments of the present invention. FIG. 12A illustrates a circuit in a pixel of an organic light emitting display, and FIG. 12B illustrates a circuit in a pixel of a liquid crystal display. The illustrated circuits are basic circuits of these types of display devices. However, the present invention is not limited thereto. For example, the number of thin film transistors and capacitors may change as desired.

FIG. 12A illustrates a circuit in a pixel of an organic light emitting display. Each sub-pixel in an active area AA has a circuit unit including at least one thin film transistor S-Tr and D-Tr, a storage capacitor Cst, and an organic light emitting diode OLED connected to the storage capacitor Cst and the thin film transistor D-Tr. FIG. 12A illustrates an example in which a selecting thin film transistor S-Tr and a driving thin film transistor D-Tr are provided. One or more additional thin film transistors may be added as desired. The driving thin film transistor D-Tr is electrically connected to a first electrode of the organic light emitting diode OLED, and the storage capacitor Cst is connected between a gate electrode of the driving thin film transistor D-Tr and a connection end of the driving thin film transistor D-Tr at which the driving thin film transistor D-Tr is connected to the first electrode of the organic light emitting diode OLED. The connection end may be a source electrode or a drain electrode of the driving thin film transistor D-Tr. In a case in which the connection end is the drain electrode, the source electrode is connected to a driving current line VDL such that a driving current is supplied to the source electrode. In a case in which the connection end is the source electrode, the drain electrode is connected to the driving current line VDL.

The circuit unit is provided between a gate line GL and a data line DL, which are located at a boundary of the sub-pixel in a crossing fashion. The driving current line VDL is parallel to the data line DL while being spaced apart from a data line DL of an adjacent sub-pixel. The selecting thin film transistor S-Tr is located between the gate line GL and the data line DL. The selecting thin film transistor S-Tr is connected to the gate electrode of the driving thin film transistor D-Tr, which is connected to the storage capacitor, and transmits current to the organic light emitting diode OLED via the driving thin film transistor D-Tr according to selective driving of the selecting thin film transistor S-Tr, thereby controlling ON/OFF of the organic light emitting diode OLED.

A thin film transistor having gate circuit blocks are formed so as to have a shape that is the same or similar to that of the selecting thin film transistor or the driving thin film transistor. The selecting thin film transistor corresponds in construction to the pixel thin film transistor previously described.

FIG. 12B illustrates a basic circuit of a liquid crystal display. Sub-pixels, defined by a plurality of gate lines GL and a plurality of data lines DL, each include a thin film transistor (TFT) and a liquid crystal capacitor Clc connected to the TFT. The liquid crystal capacitor Clc includes a pixel electrode connected to the TFT and a common electrode, disposed such that a liquid crystal is disposed between the common electrode and the pixel electrode. The TFT supplies an image signal from each data line DL to the pixel electrode in response to a scan pulse from each gate line GL.

The liquid crystal capacitor Clc is charged with a difference voltage between the image signal supplied to the pixel electrode and common voltage SVcom applied to the common electrode, and varies an arrangement of liquid crystal molecules based on the difference voltage to adjust light transmittance, thereby realizing gradations. A storage capacitor Cst retains a voltage in the pixel electrode. A dielectric material may be provided between the pixel electrode and the storage capacitor such that the storage capacitor overlaps the pixel electrode.

Figure 13:
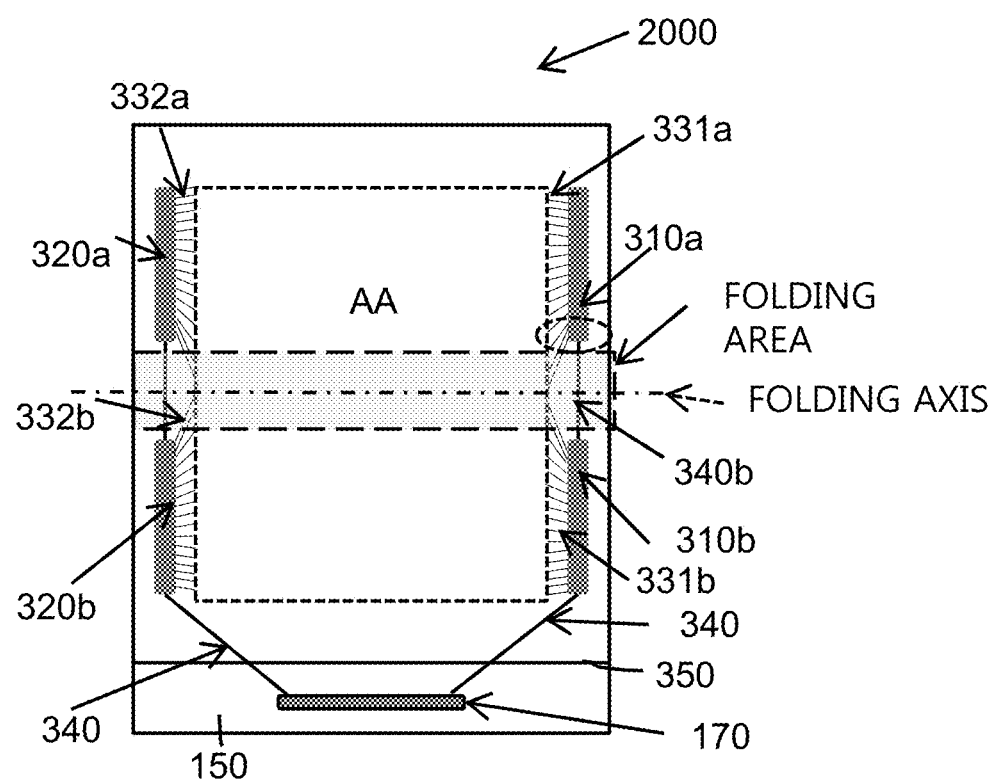
FIG. 13 is a plan view illustrating a flexible display according to an embodiment of the present invention.
Figure 14:
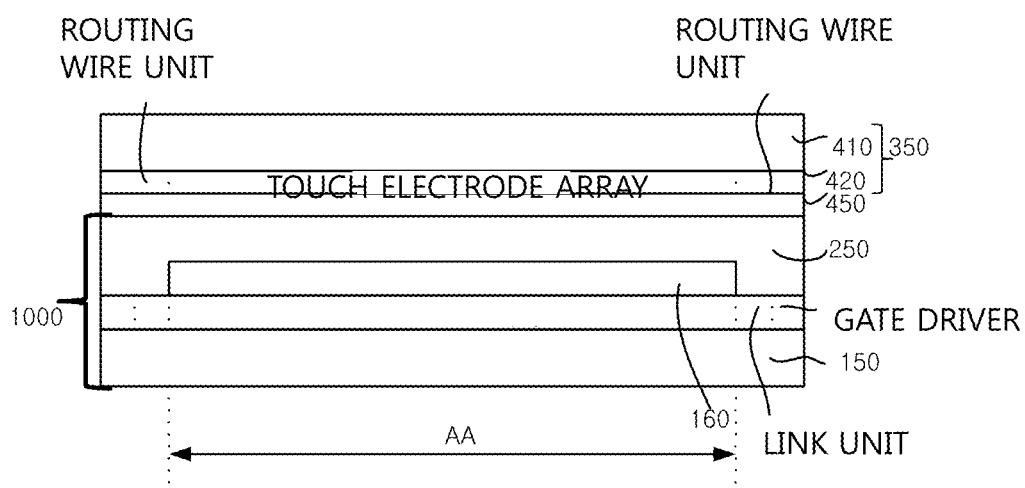
FIG. 14 is a sectional view taken along line III-III' of FIG. 13.

FIG. 13 is a plan view illustrating a flexible display according to an embodiment of the present invention, and FIG. 14 is a sectional view taken along line III-III' of FIG. 13.

In the flexible display, each pixel in an active area includes a circuit as illustrated in FIG. 12A or 12B. As illustrated in FIGS. 13 and 14, gate drivers 310a, 310b, 320a, and 320b, which are disposed separately above and below the folding line, link wires 331a, 331b, 332a, and 332b for connecting the gate drivers 310a, 310b, 320a, and 320b to corresponding ends of the gate lines, and a driver IC 170 are disposed in a non-display area of the first flexible base film 150.

The backplane substrate in this embodiment is different from the previously described backplane substrates in that a second flexible base film 410, through which the driver IC 170 is exposed, a touch unit 350 having a touch electrode array 420 provided inside the second flexible base film 410, and an adhesive layer 450 disposed between the touch unit 3560 and the backplane substrate 1000 are further provided.

FIG. 14 schematically illustrates a layer structure of the flexible display. The backplane substrate 1000 has a TFT array in the active area AA on the first flexible base film 150 and an organic light emitting array 160 formed thereon. The above-described link units and gate drivers are disposed in the non-display area in the same plane as the TFT array.

A barrier stack 250, formed by alternately stacking organic films and inorganic films, covers the upper surface and the side surfaces of the organic light emitting array 160 in order to reduce or prevent external moisture or air from permeating into the organic light emitting array 160. That is, the organic light emitting array 160 is encapsulated by the barrier stack 250.

Meanwhile, the touch electrode array 420 corresponds to the active area AA. A routing wire 425 may be further disposed in the non-display area in the same plane as the touch electrode array 420.

Figure 15:
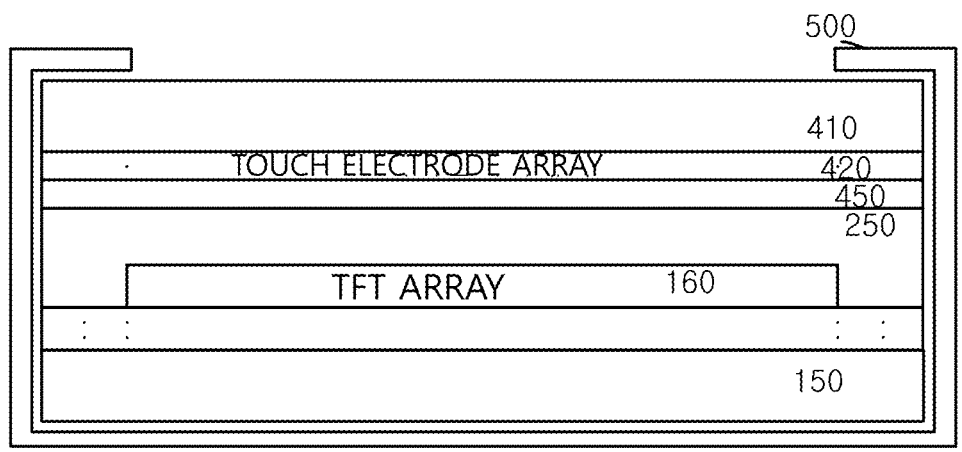
FIG. 15 is a sectional view illustrating a flexible display according to an embodiment of the present invention when a bezel is applied to the flexible display.

FIG. 15 is a sectional view illustrating the flexible display of FIG. 14, when a bezel is applied to the flexible display.

Referring to FIG. 15, the flexible display may be used for various types of applications, such as a cellular phone, a TV, and a monitor. The non-display area of the flexible display may be covered by a bezel 500 in order to reduce or protect the flexible display from external impacts and to provide an aesthetically pleasing appearance. However, the present invention is not limited to the illustrated examples. The bezel 500 may have various shapes. In most cases, the bezel 500 is configured to have a shape that covers the non-display area of the flexible display. The bezel 500 may be made of plastic or metal exhibiting high rigidity. In addition, the thickness of a portion of the bezel 500 corresponding to the folding line may be reduced such that the bezel 500 can be curved.

In a case in which the gate drivers are embedded in a portion corresponding to the bezel, the gate drivers are disposed such that the gate drivers do not overlap the folding line in order to reduce or prevent cracks or device degradation from occurring in the folding area during repeated folding, and the link wires are formed between the gate drivers, the position of which is adjusted, and the gate lines for correspondence between the gate drivers and the gate lines such that the gate drivers are connected to pixels in the active area, thereby effectively reducing defects in the folding area and thus improving the reliability of the flexible display.

In this embodiment, the folding line is defined in the X-axis direction. However, the present invention is not limited thereto. The folding line may be defined in a direction other than the X-axis direction. Even in a case in which the folding line does not have the X-axis direction, overlapping between the folding line and the gate drivers can be prevented to reduce or prevent cracks or device degradation from occurring in the folding area. The present invention is not limited to overlapping between the folding line and the gate drivers. The present invention may be applied to a panel in driver, which is embedded in the backplane substrate. In addition, the present invention may also be applied to a bendable display in addition to the foldable display.

A backplane substrate and a flexible display using the same according to embodiments of the present invention may have the following advantages.

First, an embedded type driver circuit is provided away from a folding area or bending area to reduce or prevent folding defects such as cracks and device degradation from occurring at the folded or bent portion during repeated folding or bending.

Second, in a case in which the embedded type driver circuit includes gate drivers, the gate drivers are disposed separately above and below the folding line. Since a Y-pitch between the separated gate drivers is reduced, link wires for interconnecting the gate drivers and the gate lines are further provided on a one-to-one correspondence between the gate lines and the gate circuit blocks in the gate drivers. As a result, even when no driver circuit is formed in the folding area, it is possible to apply signals to all the gate lines. In addition, clock signal lines and/or voltage signal lines, which are arranged so as to have predetermined widths, are disposed between the separated gate drivers to distribute folding stress.

Third, a single-layered or multiple-layered structure having a high conductivity may be applied to link wires or signal lines provided on the gate driver side in order to reduce or prevent an increase in resistance due to the provision of the link wires.

Fourth, slits are formed in an organic or inorganic film to correspond to the folding line so as to further distribute folding stress.

It will be apparent to those skilled in the art that various modifications and variations can be made in the present invention without departing from the spirit or scope of the invention. Thus, it is intended that the present invention covers the modifications and variations of this invention provided they come within the scope of the appended claims and their equivalents.

What is claimed is:

1. A flexible display device comprising:
a backplane substrate having an active area and a non-display area outside the display area, the active area having a plurality of pixels defined with a plurality of gate lines and a plurality of data lines, wherein the backplane substrate is defined with a folding axis with reference to which the display device is folded or bended and a folding area in which a radius of curvature remains substantially the same as a radius of curvature at the folding axis located at a center of the folding area when the display device is folded or bended;
a plurality of embedded drivers on the backplane substrate in the non-display area, wherein two of the embedded drivers are spaced apart from each other outside the folding area with the folding area therebetween; and a plurality of link wires between the plurality of embedded drivers and the active area, electrically connecting the plurality of embedded drivers and one of the plurality of gate lines and the plurality of data lines.

2. The display device according to claim 1, wherein the two of the embedded drivers are electrically connected to each other through a signal line passing through the folding area.

3. The display device according to claim 2, further comprising a timing controller that provides a clock signal to the signal line.

4. The display device according to claim 1, wherein the two of the embedded drivers are electrically connected to each other through one or more of a clock signal line and a voltage signal line passing through the folding area.

5. The display device according to claim 4, wherein the voltage signal line transmits one of a gate high voltage, a gate low voltage and a reference voltage.

6. The display device according to claim 1, wherein the two of the embedded drivers are not provided in an area in which a radius of curvature is equal to or less than twice the radius of curvature at the folding axis.

7. The display device according to claim 1, wherein one pair of the embedded drivers are facing each other with the active area therebetween.

8. The display device according to claim 1, wherein the embedded drivers are gate drivers electrically connected to the plurality of gate lines.

9. The display device according to claim 8, wherein each of the gate drivers includes a plurality of gate circuit blocks, each having a shift register, a level shifter and a buffer, and wherein a pitch of each gate circuit block is smaller than that of the plurality of gate lines in the active area.

10. The display device according to claim 1, wherein the embedded drivers are data drivers electrically connected to the plurality of data lines.

11. The display device according to claim 1, wherein the link wires within the folding area have a longer length than the link wires outside the folding area.

12. The display device according to claim 1, wherein the link wires within the folding area have a steeper inclination with respect to the folding axis than the link wires outside the folding area.

13. The display device according to claim 12, wherein the closer the link wires are to the folding axis, the steeper the inclination of the link wires is.

14. The display device according to claim 1, wherein the backplane substrate has a thickness of 5 µm to 150 µm.

15. The display device according to claim 1, wherein the link wires are formed of the same material as either the gate lines or the data lines.

16. The display device according to claim 15, wherein the link wires have a multi-layered structure.

17. The display device according to claim 1, wherein the link wires in the folding area have a zigzag shape.

18. The display device according to claim 1, further comprising an inorganic insulating layer having a plurality of slits, wherein a longer direction of the plurality of slits is substantially parallel with the folding axis.

19. The display device according to claim 18, wherein the inorganic insulating layer is provided between the backplane substrate and the gate lines, between the gate lines and the data lines, or on the data lines.

20. The display device according to claim 1, wherein the signal line passing through the folding area is disposed on or below the inorganic insulating layer having the plurality of slits.

21. The display device according to claim 1, wherein the display device is an organic light emitting diode display device, and the active area includes an organic light emitting array.

22. The display device according to claim 21, further comprising a barrier stack encapsulating the organic light emitting array.

23. The display device according to claim 22, further comprising a touch unit on the barrier stack, wherein the touch unit includes a second flexible base film and a touch electrode array.

24. The display device according to claim 23, wherein the touch electrode array corresponds to the active area and is electrically to a plurality of routing wires provided in the non-display area.

* * * * *